United States Patent [19]

Ludemann et al.

[11] Patent Number: 4,719,569
[45] Date of Patent: Jan. 12, 1988

[54] ARBITRATOR FOR ALLOCATING ACCESS TO DATA PROCESSING RESOURCES

[75] Inventors: James J. Ludemann, Mountain View; Andreas Bechtolsheim, Stanford, both of Calif.

[73] Assignee: Sun Microsystems, Inc., Mountain View, Calif.

[21] Appl. No.: 786,596

[22] Filed: Oct. 11, 1985

[51] Int. Cl.$^4$ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,275,440 | 6/1981 | Adams, Jr. et al. | 364/200 |
| 4,453,214 | 6/1984 | Adcock | 364/200 |
| 4,536,839 | 8/1985 | Shah et al. | 364/200 |
| 4,574,350 | 3/1986 | Starr | 364/200 |

OTHER PUBLICATIONS

A. L. Bergey, Jr. et al., "Method for Decreasing Arbitration Overhead", IBM Technical Disclosure Bulletin, vol. 26, No. 7A, pp. 3370-3371, (Dec. 1983).

*Primary Examiner*—Gareth D. Shaw
*Assistant Examiner*—Rebecca L. Adams
*Attorney, Agent, or Firm*—Blakely, Sokoloff, Taylor & Zafman

[57] ABSTRACT

The present invention provides an improved arbitrator for use in allocating access to a common resource coupled to a plurality of data processing devices ("agents"). An arbitrator is coupled between the resource and each of the agents, for selectively enabling individual agents to access the resource in accordance with a predetermined priority hierarchy. The arbitrator, in the presently preferred embodiment, receives request signals transmitted by an agent desiring to access the resource and allocates ownership on a first come first serve basis or by a four level hierarchy in the case of simultaneous requests. The arbitrator includes a timing circuit which times predetermined periods between request signals transmitted by the agent which has acquired ownership. The arbitrator senses multiple requests for access by the agent within the predetermined time period, and, enters a lock condition if the agent issues a second request within the predefined period. The lock condition provides exclusive access to the agent which acquired ownership and transmitted the multiple request signals within the period or locks out one or more other agents. This lock condition locks out selected other agents form acquiring access until the enabled agent ceases to transmit the multiple request signals within the period. The effect of the lock is to provide continuous or enhanced resource access to those agents which transmit data faster than the other agents and in a burst fashion.

14 Claims, 5 Drawing Figures

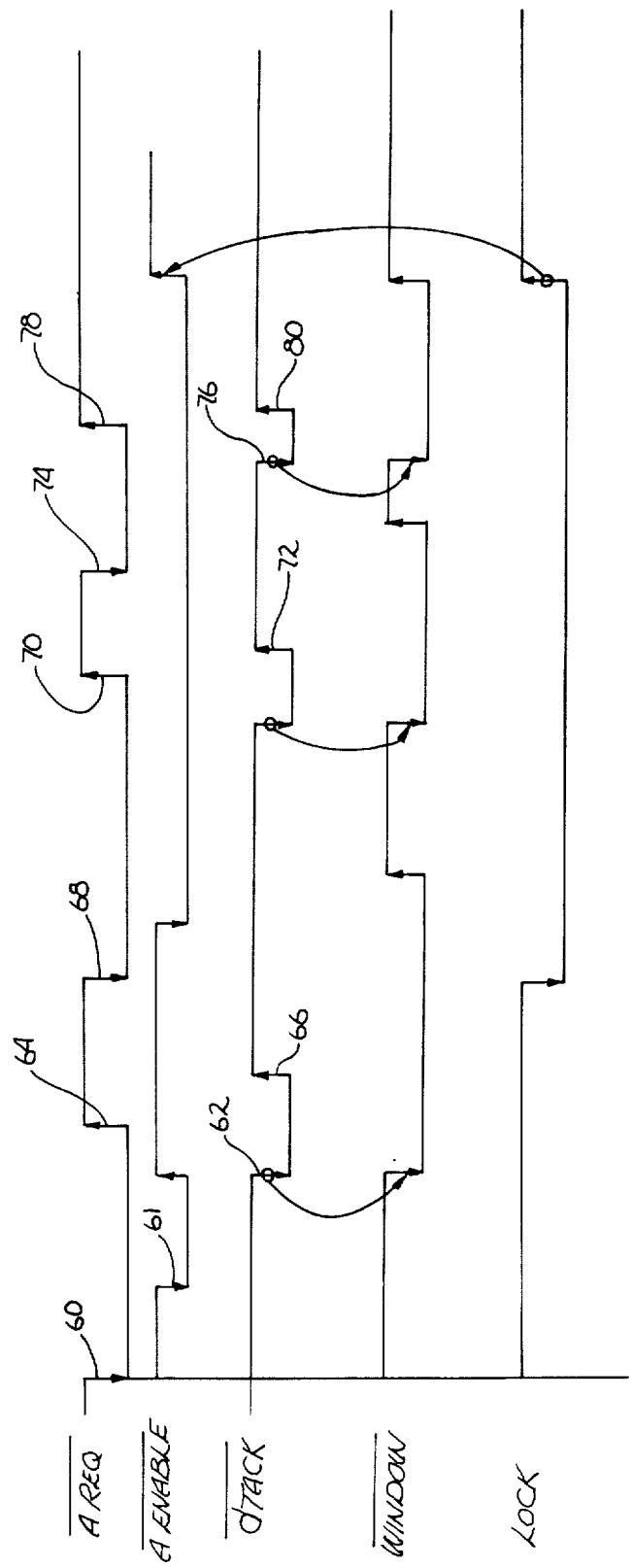

ARBITRATOR FOR ALLOCATING ACCESS TO DATA PROCESSING RESOURCES

BACKGROUND OF THE INVENTION

1. Field of the Invention

The present invention relates to apparatus and methods for arbitrating access of a plurality of data processing devices to a common data processing resource. More particularly, the present invention relates to an arbitrator which locks out other data processing devices in favor of a device exhibiting specific behavior.

2. Art Background

In the computing industry, it is quite common to transfer data and commands between a plurality of data processing devices ("agents"), such as for example, computers, and a variety of data processing resources (e.g. a system bus, printer, memory, etc.). In order to avoid chaos, some arbitration means must be utilized to allocate access to the common resource by the agents in an orderly fashion. For example, one agent may transmit messages and/or data packets to another agent along a bus while other agents may concurrently require bus access in order to execute other data processing operations. The bus arbitrator determines which agent shall be permitted access to the bus and what order other agents awaiting bus access will acquire ownership.

Historically, arbitration devices have allocated access using a variety of predetermined hierarchies of priority. For example, some arbitrators utilize a system in which access is a direct function of the order in which the requests are received from the agents. Other systems incorporate priority levels for access, and each agent is assigned a particular priority value. Generally, existing arbitration systems attempt to achieve a level of "fairness" which insures that no one agent may dominate the resource and thereby starve other agents having lower priority levels.

Existing arbitration systems generally work well where agents transmit relatively long messages or only require access occasionally. In those instances where repetitive and sequential high speed burst transmissions from one agent to another occur, relatively large amounts of time are wasted during the transfer of resource ownership from one agent to another between transmissions. As will be described, the present invention provides an arbitration system which has the capability of locking out access by other agents, and thereby permitting only a single or selected agents to gain ownership of the resource based on recent transmission history. Using the present invention, faster data processing devices achieve a higher level of performance for multiple burst transmissions, since the time required for reallocating resource ownership between burst transmissions is eliminated.

SUMMARY OF THE INVENTION

The present invention provides an improved arbitrator for use in allocating access to a common resource (such as a bus, memory and the like) coupled to a plurality of data processing devices ("agents"). An arbitrator is coupled between the resource and each of the data processing devices, for selectively enabling individual agents to access the resource in accordance with a predetermined priority hierarchy. The arbitrator, in the presently preferred embodiment, receives request signals transmitted by an agent desiring to access the resource and allocates ownership on a first come first serve basis. Other hierarchies may be defined, such that the arbitrator allocates access in accordance with a weighted priority or other system. The arbitrator includes a timing circuit which times predetermined periods between request signals transmitted by the agent which has acquired ownership. If the arbitrator senses multiple requests for access by the agent within the predetermined time period, it enters a lock state. The lock state provides exclusive access to the agent which acquired ownership and transmitted the multiple request signals within the period, or to a selected group of one or more agents. This lock state precludes one or more other selected agents from acquiring access until the enabled agent ceases to transmit the multiple request signals within the period. The effect of the lock state is to provide continuous or enhanced resource access to those agents which transmit data faster than the other agents in a burst fashion. In the presently preferred embodiment, the arbitrator maintains the lock state until the transmitting agent fails to transmit multiple request signals within the period, or alternatively, until a predetermined time "T" has elapsed. The deassertion of the lock then provides all other agents with the opportunity to issue request signals to the arbitrator and acquire access to the resource.

BRIEF DESCRIPTION OF THE DRAWINGS

FIG. 5 is a timing diagram illustrating the present invention's use of a lock to increase system performance for high speed data processing devices.

DETAILED DESCRIPTION OF THE INVENTION

An arbitrator for allocating access to a common data processing resource coupled to a plurality of data processing devices ("agents") is disclosed. In the following description, for purposes of explanation, specific numbers, times, signals, architectures, etc. are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

Figure 1:
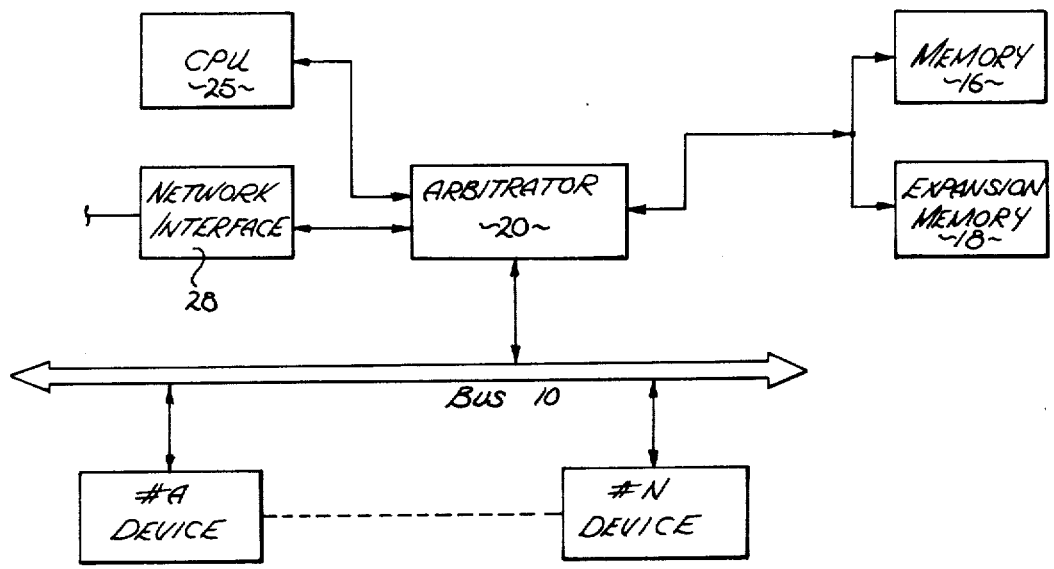
FIG. 1 is a block diagram of one implementation of the present invention.

Referring now to FIG. 1, the presently preferred embodiment includes a bus 10 on which a plurality of data processing devices ("agents") numbered #A through #N are disposed. As is well known, data processing agents communicate between one another over bus 10 which is comprised of a plurality of address, data, strobe and other lines. Data processing resources, such as memory 16 and expansion memory 18 may be accessed, as will be described, by agents coupled to bus 10 through arbitrator 20.

In addition, a central processing unit (CPU) 25 as well as input/output processing units such as a local area network interface 28, may, as will be discussed, access data processing resources such as memory 16 and expansion memory 18 through the arbitrator 20. Although the present invention is described in this Specification with reference to the architecture disclosed in FIG. 1, it will be appreciated by one skilled in the art that the present invention has utility in a variety of data processing applications. For example, the teachings of the present invention may be utilized in those instances wherein a plurality of agents are coupled to arbitrator 20 to gain access to other data processing resources, such as for example, a local area network or bus.

Figure 4:
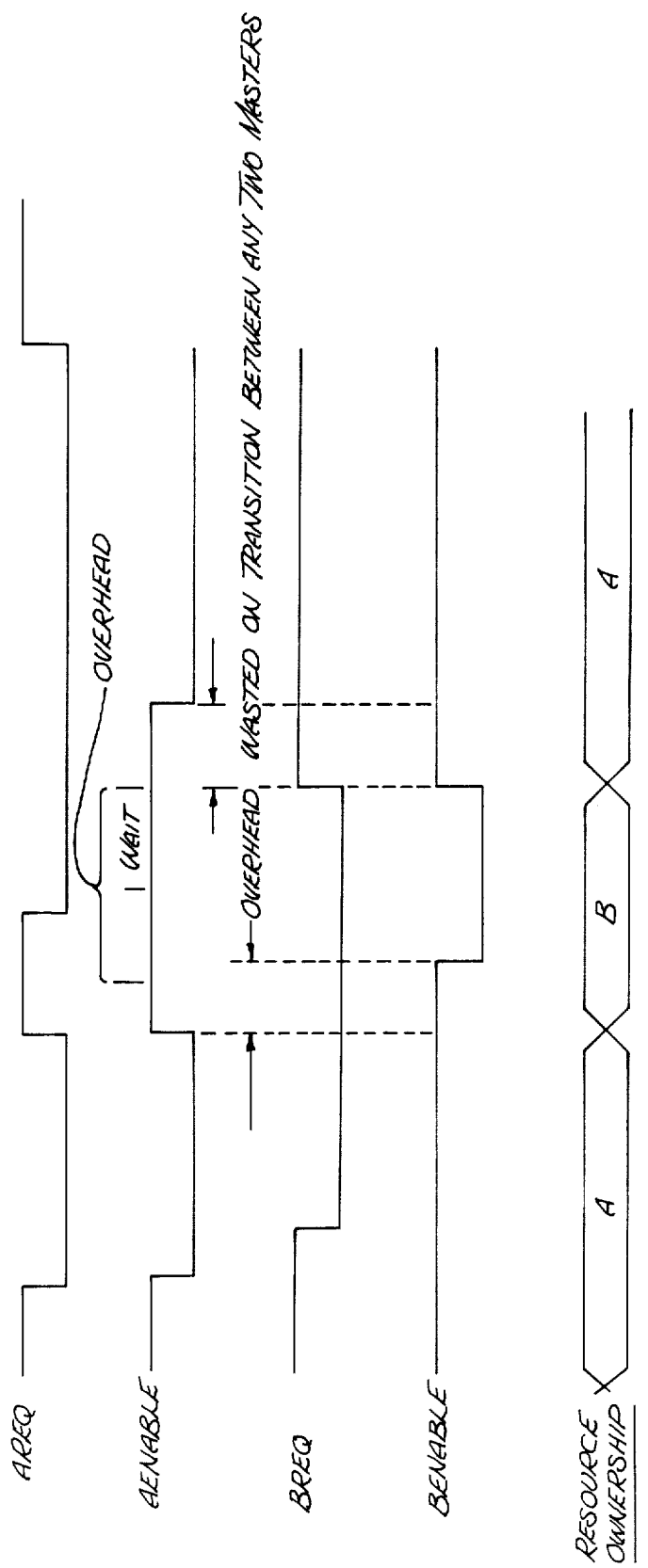
FIG. 4 is a timing diagram illustrating the state of various signals in the absence of a lock condition.

Referring briefly to FIG. 4, when an agent, for example data processing devices #A coupled to bus 10, desires to access a data processing resource, for example memory 16, the agent transmits a request signal to the arbitrator 20. The arbitrator 20 selectively provides access to a data processing resource, such as memory 16, based on a predetermined hierarchy. In the presently preferred embodiment, arbitrator 20 provides access to the common resource on a multiple-level prioritized basis, such that the agent whose request is first received is provided with access to memory 16 or expansion memory 18 unless prioritization is required when more than one request arrives simultaneously. As illustrated in FIG. 4, upon the receipt of a request signal (AREQ), arbitrator 20 issues an enable command (AENABLE), thereby providing access to the local resource to the requesting agent #A. Subsequent to the first agent obtaining access to the resource, data processing device #B issues a request to the arbitrator 20 for access. Upon completion of the data transfer operation by agent #A, the arbitrator 20 terminates access to the resource and provides an enable signal to agent #B (BENABLE) which then gains resource ownership. Upon completion of the data operation by agent #B, the arbitrator 20 deasserts the BENABLE signal, such that agent #B looses ownership of the resource, which, in the present example of FIG. 4, is then once again provided to agent #A. Due to the nature of current electronic implementations, a significant amount of time can be wasted on each transition between agents.

It should be noted that in the example of FIG. 4, agent #A reasserted a request signal immediately subsequent to the completion of its previous data operation, but could not acquire ownership of the resource until after agent #B had completed its use of the resource. In the example, agents requesting access to the data processing resource, such as memory 16, acquire ownership in a linear sequential manner. However, in the event that an agent requires additional access to the resource, and is transmitting in a burst fashion, the resource allocation scheme illustrated in FIG. 4 proves inefficient, since the faster data processing device must wait until the completion of the data transfer operation of agent #B prior to regaining resource ownership. The time period between the reassertion of agent #A's request and the reacquisition of resource ownership represents overhead time in which the faster data processing device is retained in an idle condition awaiting access. Moreover, additional time is wasted during transitions from agent #A to #B and back to #A (see FIG. 4).

Figure 2:
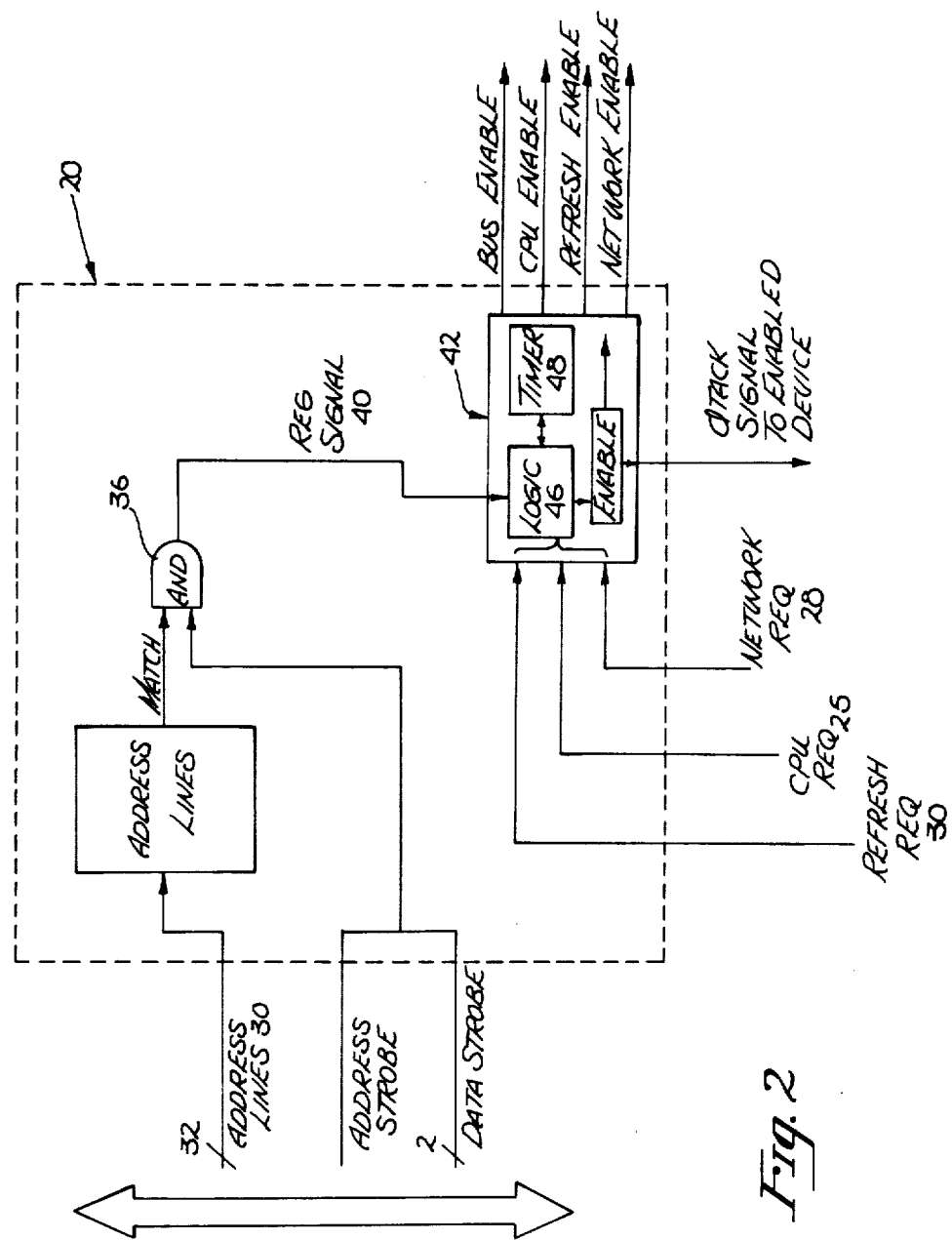
FIG. 2 is a block diagram illustrating the arbitrator which incorporates the teachings of the present invention.

Referring now to FIG. 2, the basic architecture and operation of the arbitrator 20 will be described in more detail. In the presently preferred embodiment, bus 10 includes 32 address lines as well as address strobe and data strobe lines. The address lines 30 are coupled to arbitrator 20 and to an AND gate 36. The address strobe and data strobe lines are similarly coupled to AND gate 36. If an address is applied by an agent coupled to bus 10 and either the address or data strobe lines remain true, a bus request signal 40 is outputted from AND gate 36 into an arbitrator circuit 42. Similarly, other agents, for example CPU 25, network interface 28 or a refresh request signal 30 (to refresh dynamic RAM memories 16 and/or 18) apply bus request signals to the arbitrator circuit 42. As will be discussed herein, arbitrator circuit 42 selectively enables one of the requesting agents by transmitting an enable signal to the chosen device and issues other necessary enable signals to permit access to the common resource. Arbitrator circuit 42 includes logic circuitry 46 which, in accordance with a predetermined hierarchy, allocates access to the common resource (such as memory 16). Logic circuitry 46, in a particular application, may provide weighted priorities for various agents coupled to the arbitrator 20, or otherwise provide a prioritized system for allocating access to the common resource. A timer circuit 48 is coupled to logic circuitry 46 for timing predetermined periods between the receipt of request signals transmitted by the various agents. These predetermined periods are commonly referred to as "windows", and may vary in length depending on the particular application of the present invention. In the present embodiment, timer circuit 48 measures the predetermined periods beginning with the transmission of a DTACK (data transfer acknowledge) signal by arbitrator circuit 42. The DTACK is an indication that the previous cycle is over.

Figure 3:
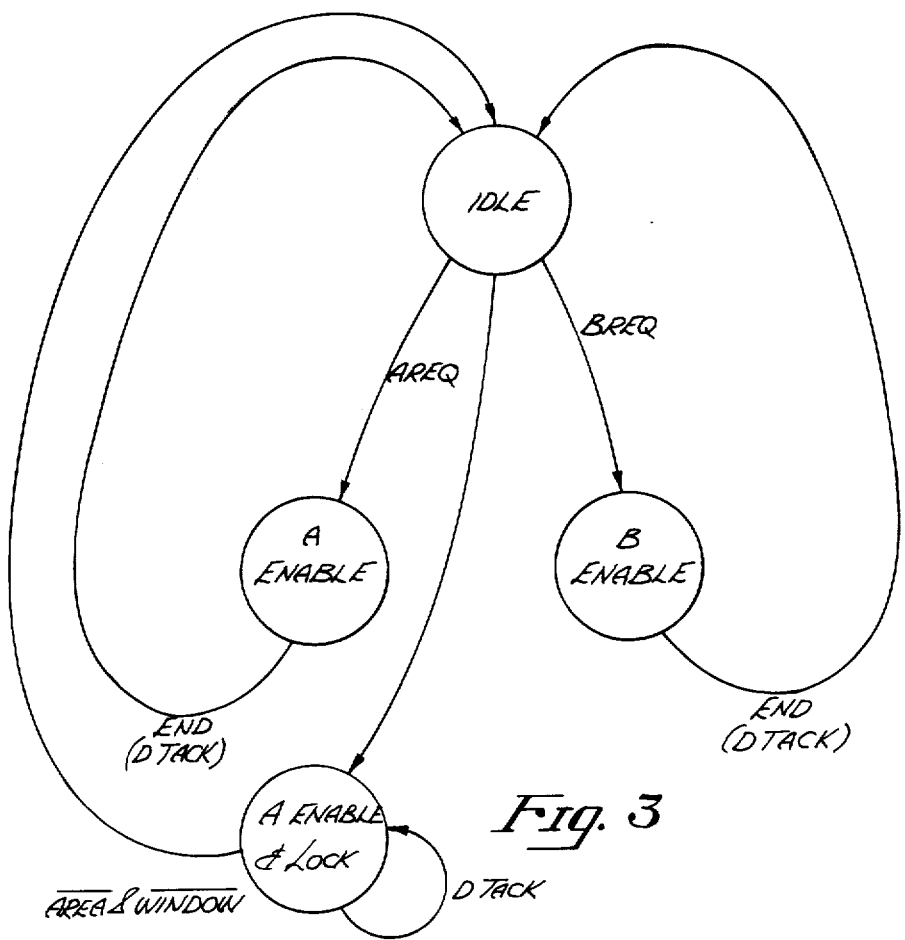
FIG. 3 is a diagrammatical illustration of a state machine generally illustrating the operation of the present invention.

Referring now to FIGS. 3 and 5, the operation of the present invention is illustrated with respect to a data processing agent #A coupled to bus 10 attempting to access memory 16. As shown in the example of FIG. 5, agent #A generates a request signal (AREQ) identified in the timing diagram of FIG. 5 by the numeral 60. Upon receipt of the request signal from agent #A, the arbitrator 20 issues an enable signal 61, and a DTACK signal when the transfer has been completed, identified in the illustration by the numeral 62. Concurrent with the transmission of the DTACK signal to the enabled device (i.e. agent #A in the present example), timer circuit 48 begins timing the predefined window period previously described. In the presently preferred embodiment, the window period is 240 nanoseconds in duration, however, a variety of window lengths may be used depending upon the particular application of the present invention. Once agent #A has received the enable signal from arbitrator 20, the agent is given access to the requested resource (i.e. bus 10 and/or memory 16) and may complete its data transfer operation. Upon completion of the data operation with the local resource, arbitrator 20 sends a DTACK signal to the agent, indicating that the access has been completed, and agent #A deasserts its request signal as illustrated in FIG. 5 by the numeral 64. Subsequent to the deassertion of the request signal, arbitrator 20 deasserts the DTACK signal to the enabled device as identified by numeral 66 in the Figure. Although the DTACK signal has been deasserted, timer circuit 48 within arbitrator circuit 42 continues counting the predefined window period. In the event that agent #A does not reassert a request signal to arbitrator 20 within the window period, access to the common resource is allocated to other agents in accordance with the sequence of operations hereinabove described, as is typical in the absence of a lock condition. However, in the example of FIG. 5, agent #A reasserts the request signal as identified by numeral 68, within the window period. Arbitrator circuit 42 senses the reassertion of agent #A's request within the period and enters a lock state which precludes logic circuit 46 from granting access to the common resource by other agents. At the completion of the next access by agent #A, arbitrator 42 issues an additional DTACK signal to agent #A and timer circuit 48 begins the timing of another window period while maintaining the arbitrator in a lock condition. The lock condition utilized by the present invention permits, in the example of FIG. 5, agent #A to maintain exclusive access to the common resource (i.e. bus 10, memory 16 and the like) between data transmissions of agent #A. The continued exclusive access to the resource by agent #A over multiple window periods eliminates time wasted in transferring access between agents in the case where the first enabled agent is prepared to continue data transfers immediately after the completion of its preceeding data transfer operation.

As illustrated in example of FIG. 5, after the completion of the second data transfer operation of agent #A, the agent deasserts its request signal (identified by the numeral 70) which results in the deassertion of the DTACK signal (identified by the numeral 72). However, in the example illustated, agent #A asserts a third request 74 within the second window period. This reassertion of a request results in a third access of the common resource by agent #A (identified by numeral 76) and the initiation of a third data transfer window. Since the reassertion of the request 74 occured within a window period, arbitrator circuit 42 maintains the lock condition, thereby excluding other agents from obtaining access between window periods. As shown, upon completion of the data transfer operation, agent #A deasserts the request signal 78 resulting in the deassertion of the DTACK signal 80. However, agent #A, in the example shown, does not reassert its request within the third window period and therefore the lock condition is deasserted. Although agent #A may request access at a later time, the deassertion of the lock condition permits access to the common resources of the data processing system by other agents, such as for example agent #N, CPU 25, or other agents coupled through the network interface 28.

It has been found that the present invention's unique lock feature increases the system performance of those data processing devices which operate at high speed and transmit data in a burst fashion. For those agents transmitting data in a repetitive burst fashion, the present invention provides exclusive access to the common resource in the data processing system, so long as the transmitting agent continues to request access for additional transmissions within the predefined window period. In the event the high speed data processing device does not reassert a request for access to the common resource within the window period, the arbitrator 20 allocates access in accordance with a predetermined hierarchy, such as for example, first come first serve.

Accordingly, an arbitrator for allocating access to data processing resources has been disclosed. While the present invention has been described with reference to FIGS. 1 throubh 5, it will be appreciated that the Figures are for illustration only, and that the present invention may be utilized in a variety of other data processing applications.

What is claimed is:

1. An arbitrator for allocating access to a data processing resource, said arbitrator coupled to a plurality of data processing devices ("agents") and said resource, for selectively enabling one of said agents to access said resource,
   each of said agents including request means for generating a request signal to request access to said resource and transmitting said request signal to said arbitrator, said arbitrator comprising:
   arbitration means coupled to said arbitrator for selectively enabling one of said agents to access said resource in accordance with a predetermined hierarchy, said arbitrator further comprising:
   timing means for timing predetermined time periods;
   sensing means coupled to said timing means for sensing multiple request signals transmitted by the same agent within one of said predetermined periods;
   lock means coupled to said sensing means for selectively providing access to said resource by an agent which transmits said multiple requests within said predetermined period, and precluding access by other agents transmitting requests so long as said agent which has acquird access continues to transmit multiple request signals within said predetermined period;
   whereby agents with multiple requests may maintain access to said resource to the exclusion of other agents until their repetitive operations are completed.

2. The arbitrator as defined by claim 1, wherein said arbitration means transmits a DTACK signal to each of said agents indicating that said enabled agent has completed its access to said resource.

3. The arbitrator as defined by claim 2, wherein said timing means begins measuring said predetermined period from the transmission of said DTACK signal.

4. The arbitrator as defined by claim 1, wherein said arbitration means terminates access to said currently enabled agent if said agent has had access to said resource greater than a predefined time T, irrespective of the timing of said request signals.

5. The arbitrator as defined by claim 3, wherein one of said agents comprises a bus having a plurality of additional data processing devices coupled thereto, said bus being treated by said arbitrator as a single agent.

6. The arbitrator as defined by claim 5, wherein said bus includes a plurality of address lines and at least one strobe line.

7. In a data processing system employing a plurality of data processing devices ("agents") coupled to an arbitrator to access a common data processing resource, said arbitrator selectively providing one of said agents access to said common resource in accordance with a predetermined hierarchy, a method for allocating said access by said arbitrator, comprising the steps of:
   said agent desiring access to said resource generating a request signal and transmitting said request signal to said arbitrator;
   said arbitrator timing predetermined time periods and sensing multiple request signals transmitted by the same agent within said predetermined period;
   said arbitrator selectively enabling said agents to access said resource in accordance with said predetermined hierarchy, and precluding access by selected other agents so long as said enabled requesting agent continues to transmit said mulitple request signals within said predetermined period;

whereby an agent transmitting mulitple requests may maintain access to said resource to the exclusion of selected other agents until its operations are completed.

8. The method as defined by claim 7, further including the step of said arbitrator transmitting a DTACK signal indicating said enabled agent has completed its access to said resource.

9. The method as defined by claim 8, wherein said arbitrator terminates access to said currently enabled agent if said agent has had access to said resource greater than a predefined time T, irrespective of the timing of said request signals.

10. The method as defined by claim 8, wherein said timing step is initiated upon the transmission of said DTACK signal.

11. The method as defined by claim 10, wherein one of said agents comprises a bus having a plurality of additional data processing devices coupled thereto, said bus being treated by said arbitrator as a single agent.

12. The method as defined by claim 11, wherein said bus includes a plurality of address lines and at least one strobe line.

13. In a data processing system wherein a plurality of data processing devices ("agents") are coupled along a common bus having a plurality of address lines and at least one strobe line, an arbitrator coupled to said bus and to a data processing resource for selectively providing one of said agents access to said resource, comprising:

request signal generation means for generating a request signal if an agent transmits an address on said address lines and said strobe line is enabled;

timing means coupled to said request signal generation means for timing predetermined time periods;

logic means coupled to said sensing means for selectively providing access to said resource by an agent generating multiple requests within said predetermined period, and precluding access by other agents so long as said enabled agent continues to generate multiple request signals within said predetermined period;

whereby agents generating multiple requests may maintain access to said resource to the exclusion of selected other agents.

14. The arbitrator as defined by claim 13 wherein said request signal generation means includes a comparator coupled to said address lines, the output of said comparator and said strobe line being coupled to an AND gate, the output of which comprises said request signal.

* * * * *